US012778321B2

(12) United States Patent
Budziwojski

(10) Patent No.: US 12,778,321 B2
(45) Date of Patent: Nov. 3, 2026

(54) FITTING SYSTEM FOR DISPLAY CASE PANELS

(71) Applicant: Kingdom Brick Supply LLC, Sunnyvale, CA (US)

(72) Inventor: Daniel Karol Budziwojski, Sunnyvale, CA (US)

( * ) Notice: Subject to any disclaimer, the term of this patent is extended or adjusted under 35 U.S.C. 154(b) by 54 days.

(21) Appl. No.: 18/429,133

(22) Filed: Jan. 31, 2024

(65) Prior Publication Data

US 2025/0241460 A1 Jul. 31, 2025

(51) Int. Cl.

| | |
|---|---|
| ***A47F 3/00*** | (2006.01) |
| ***A47B 47/00*** | (2006.01) |
| ***A47F 3/12*** | (2006.01) |
| ***A47F 3/14*** | (2006.01) |
| ***F16B 12/14*** | (2006.01) |

(52) U.S. Cl.

CPC ................ *A47F 3/004* (2013.01); *A47F 3/12* (2013.01); *A47F 3/145* (2013.01); *A47B 47/00* (2013.01); *F16B 12/14* (2013.01)

(58) Field of Classification Search

CPC .... A47F 3/00; A47F 3/004; A47F 3/12; A47F 3/145; A47B 47/0016; A47B 47/0025; A47B 47/0066; A47B 47/042; A47B 47/0075; B27F 1/02; B27F 1/12; F16B 12/00; F16B 12/14; F16B 23/00; F16B 2012/145

USPC ........... 312/114, 263, 265.5, 265.6; 403/259, 403/231, 205, 260, 21, DIG. 10, DIG. 11, 403/DIG. 12; 411/103, 104, 427, 439, 411/231, 378, 340, 270, 37; 52/589.1, 52/590.1

See application file for complete search history.

(56) References Cited

U.S. PATENT DOCUMENTS

| | | | | |
|---|---|---|---|---|
| 3,967,432 A * | 7/1976 | Starr | F16B 37/043 411/103 | |
| 4,353,663 A * | 10/1982 | Glickman | F16B 12/20 403/231 | |
| 2013/0048632 A1* | 2/2013 | Chen | B65D 11/1873 220/4.33 | |

* cited by examiner

*Primary Examiner* — Daniel J Troy
*Assistant Examiner* — Elizabeth Irene Artalejo
(74) *Attorney, Agent, or Firm* — Richard Bennett Salles

(57) ABSTRACT

Disclosed is a modular display case system comprising panels joined using specially designed wedge-style fittings. Each fitting features three structural sections: an inner section that anchors inside the case, a tapered middle section for easy-sliding insertion, and an outer section that secures the fitting from the outside of the panel. The fitting is inserted into dovetail-style notches, or grooves, in the panels by sliding-then-snapping into place due to friction overcome by the fitting's inner-middle section's tapering. The outermost portions of the fitting are slightly larger than the fitting's matching panel dovetail groove, further anchoring the panels together, in addition latter screw-tightening from a perpendicular panel. This design enables quick assembly, stable joints, and varied configurations, shapes and sizes using panels with optionally cut-out slots, tabs, indentations, and screw holes. The fittings promote one-direction insertion and tool-assisted tightening for a seamless structural appearance.

3 Claims, 15 Drawing Sheets

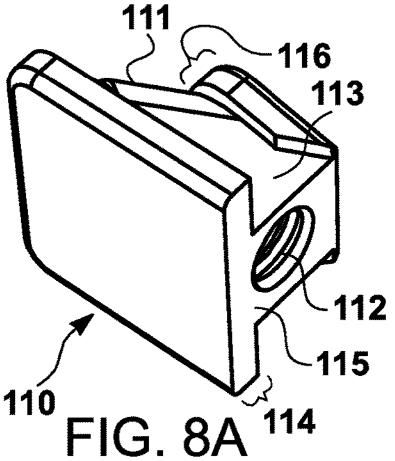
FIG. 8A
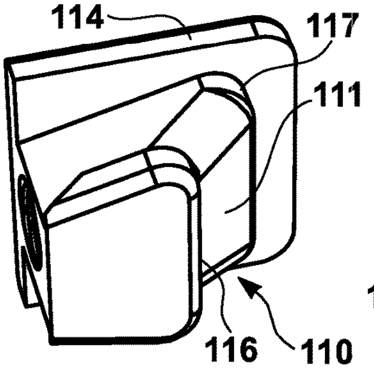
FIG. 8B
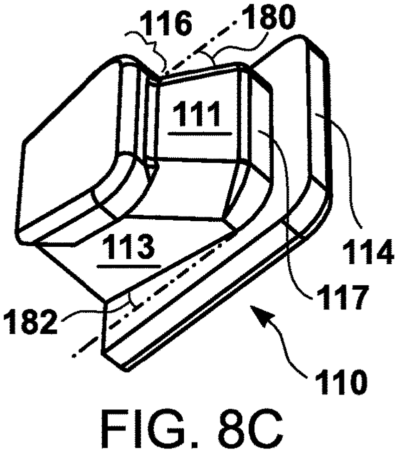
FIG. 8C
FIG. 8D
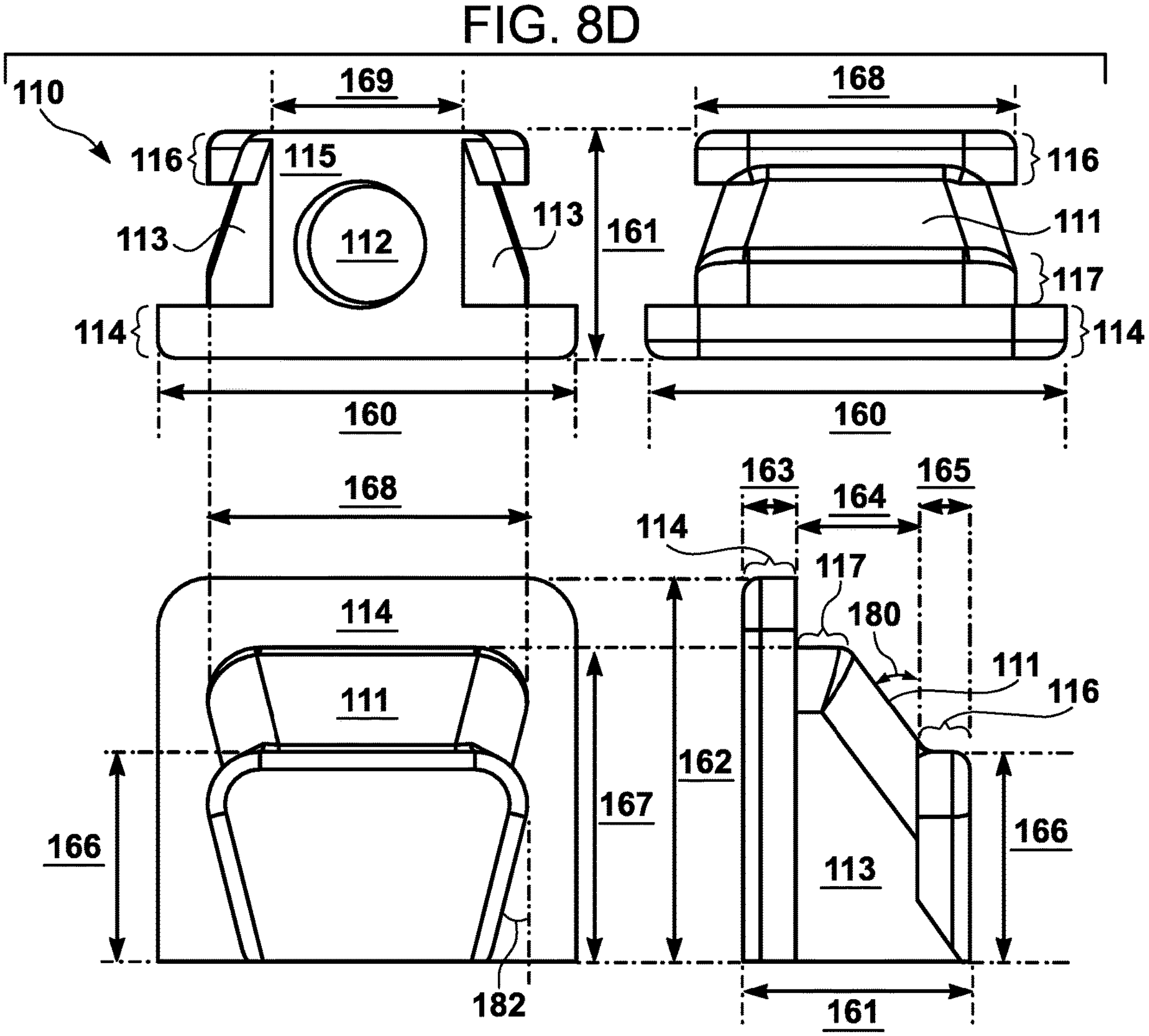

FITTING SYSTEM FOR DISPLAY CASE PANELS

CLAIM OF PRIORITY

This application currently claims priority to, and incorporates by reference, no prior U.S. patent applications.

TECHNICAL FIELD

This disclosure relates to the technical field of display cases, panels, and fittings therefore.

BACKGROUND

Transparent (Acrylic, Lucite, Plexiglass) display cases come in a variety of forms to artfully display museum statue pieces, delicate children's' toys, sports memorabilia, etc. Since the display case must enclose the item displayed, the case is customarily assembled "on site."

A good display case kit should ideally comprise four walls, an optional base and top, and a convenient (easily assembled) method to fasten the walls (or ceiling or floor). Since one cannot arbitrarily drill screws directly into thin (e.g. 3 mm acrylic) panels, the panels should comprise slots/notches/cut-outs for fasteners (fitting-adjoining pieces) to facilitate panel-joining, which may be further secured via screws.

Ideally, these fittings should help the buyer-user in their assembly process by easily "snapping into place" so as to prevent fumbling, confusion, or any requisite fastener adjustment (e.g. rotating, flipping, inverting) before the final "screw to fully tighten" phase.

In addition, the fittings themselves should be substantially transparent and offer a substantially flush profile, so as to be barely noticeable once inserted into the translucent panels themselves.

What is needed, therefore, is a fastening method comprising fittings that facilitate efficient assembly while providing sufficient stability to the acrylic display case.

SUMMARY

Disclosed are a method and apparatus devices for an acrylic display case wherein the walls (including ceiling panels & floor panels) are adjoined using substantially wedge-shaped (trapezoidal) fittings capable of easily snapping into slot cut-outs in the acrylic panels before final screw-tightening.

The wedge-shaped fittings are easily positioned (inserted by sliding-insertion, then push-snapped) into their receiving slots in their respective panel slots (before being screw-tightened from a screw coming from the perpendicular panel).

The (informal terminology for visualization purposes only) "wedge-shaped" fitting promotes "one direction insertion" and then 'snaps into place' in its panel slot due to the fitting's "substantially three section style shape (for perspective/visualization purposes, the fitting's three "sections" colloquially/informally look like "layers" or "sections" of the fitting. Each fitting has an inner (positioned inside the box when assembled) "face section" (the inner-most region of the fitting's inner section) with a surface area slightly larger than its matching panel notch. This inner section is ultimately positioned inside the case, (informal terminology for visualization purposes) acting as an inner anchoring lip, or rim, against the acrylic panels inside wall/panel-surface.

The fitting further comprises a tapered middle section that allows for easy sliding-insertion into the panel notch-slot, and then allows gentle pressing into place. This seamless positioning is made possible due to the fitting's sloped/angled middle section tapering. After insertion (length-wise, the smaller end of the wedge fitting is inserted into the wider end of the dovetail shaped slot), as the fitting is then pressed into its slot, the tapered middle is what allows the fitting to gently move against the panel notch edge until the fitting "snaps" into place when this friction is broken.

The fitting further comprises an outer face section (outermost region of the fitting's outer section) which is substantially larger than its panel-slot. This fitting "outer face section" of its outer section, has the largest surface area of the fitting's three sections. Both the outermost "edges" of the fitting's inner and outer sections function as "lip-rim anchors" to keep the fitting firmly positioned in its panel-slot, while the trapezoidal "wedge shape" of the fitting allows efficient insertion and ultimate snap-placement.

The remainder of the system comprises modular panel walls [including ceilings & floors] (with optional cut-out slots, tabs, indentations and screw holes to build a wide variety of display cases).

BRIEF DESCRIPTION OF THE DRAWINGS

FIG. 5 highlights the panel hole, and the position where the fitting fits into its matching dovetail-shaped panel slot/notch.

FIG. 5 is a schematic view of a perpendicular panels' dovetail-shaped notch/slot and screw-hole, respectively.

FIG. 5 comprises perspective "before" and "during" views of the invention's assembly process.

Figure 5:
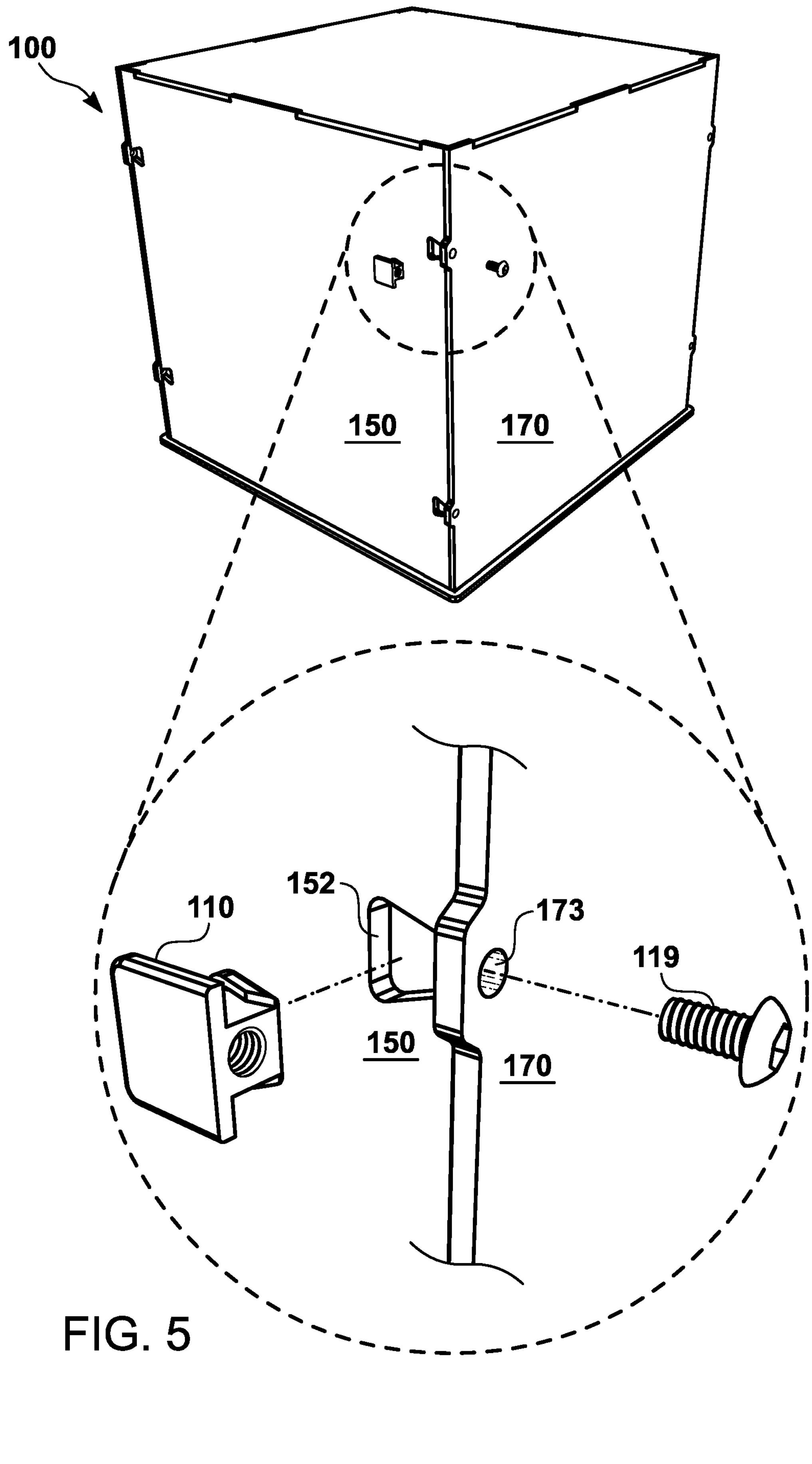
FIG. 5 is a perspective zoomed view of the invention, showing how the fitting (herein interchangeable with "fastener") ultimately "snaps" into a panel notch before a tightening screw further secures two perpendicular panels together.

Illustrations in FIG. 5 are perspective views of the panel fastening process, highlighting the fastener's flush profile with its panel inside its notch, and further showing the screw being screwed into its panel's screw hole into the perpendicular panel's fitting, now snapped into place.

Figure 6A:
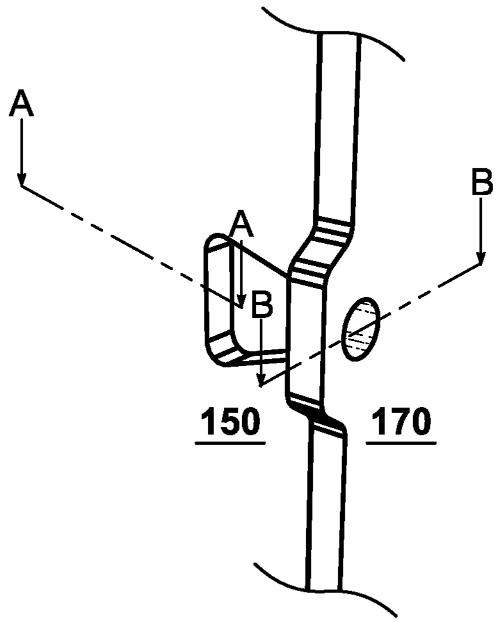

FIG. 6A is a schematic view of a perpendicular panels' dovetail-shaped notch/slot and screw-hole, respectively, for perpendicular panels. Note that, in this Figure and throughout this Disclosure, this fastening method applies to any to display case panels, whether ceilings and/or floor(s) and/or side(s). FIG. 6A schematically illustrates how two perpendicular panels are shown (cross-section)

FIGS. 6B through 6E are perspective "before" and "during" and "after/as-assembled" views of the invention's assembly process (visa vis two perpendicular display case panels).

Figure 6B:
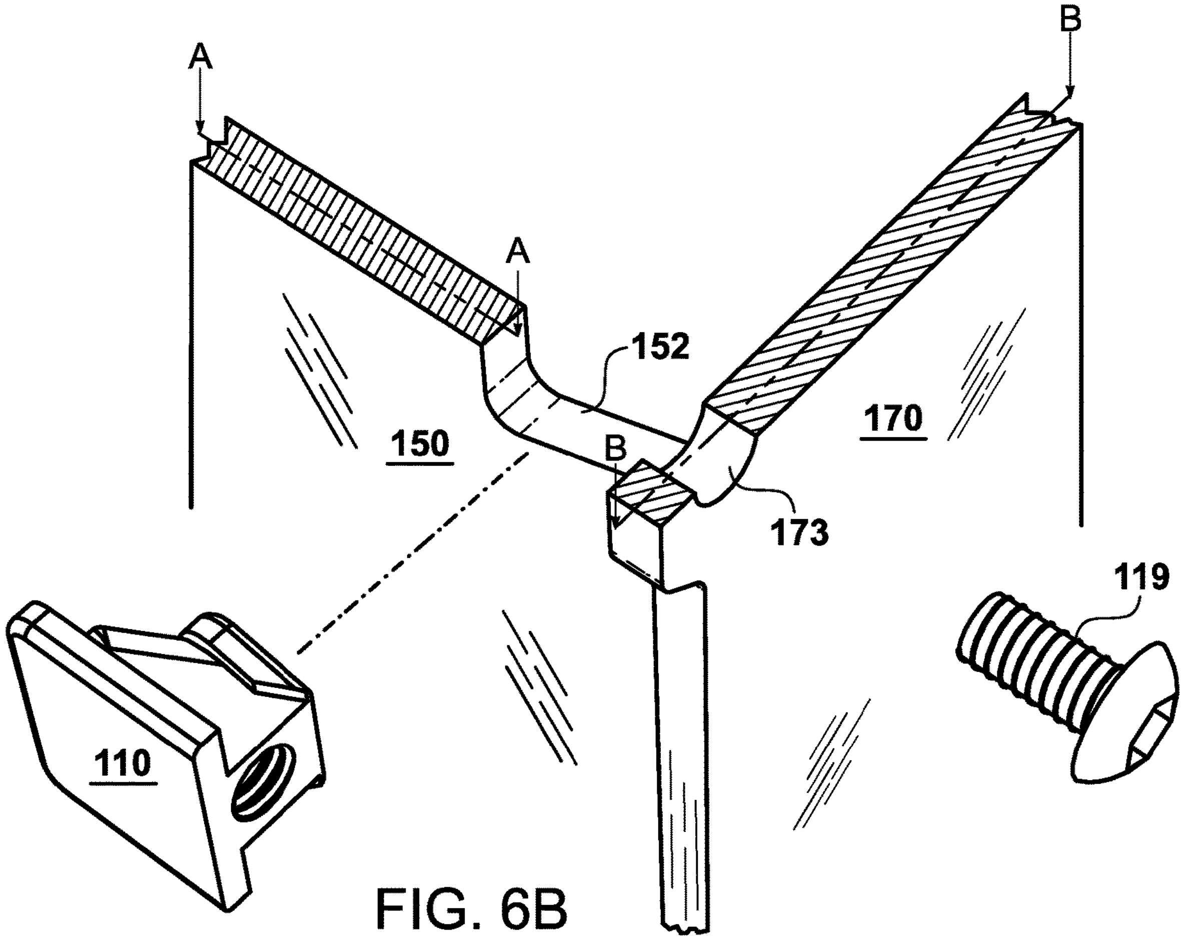

FIG. 6B highlights the panel's dovetail shaped notch-slot, and also shows the position of an exemplary panel's screw hole.

Figure 6C:
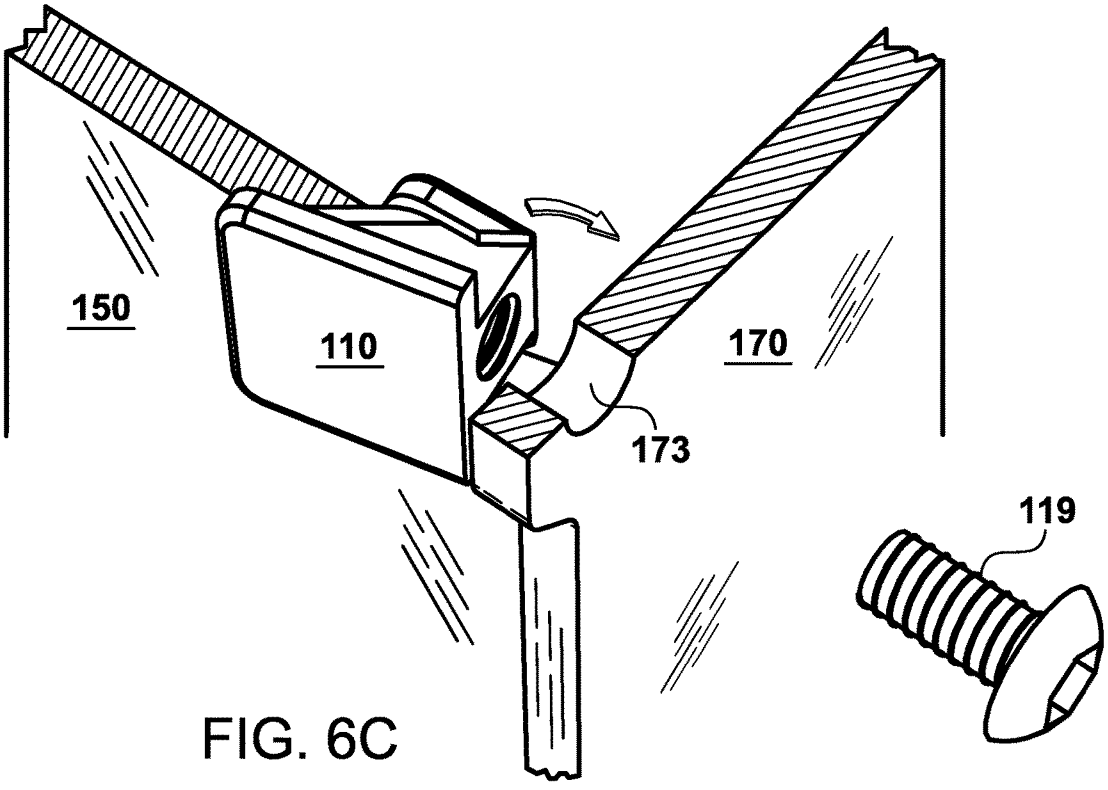
Figure 6D:
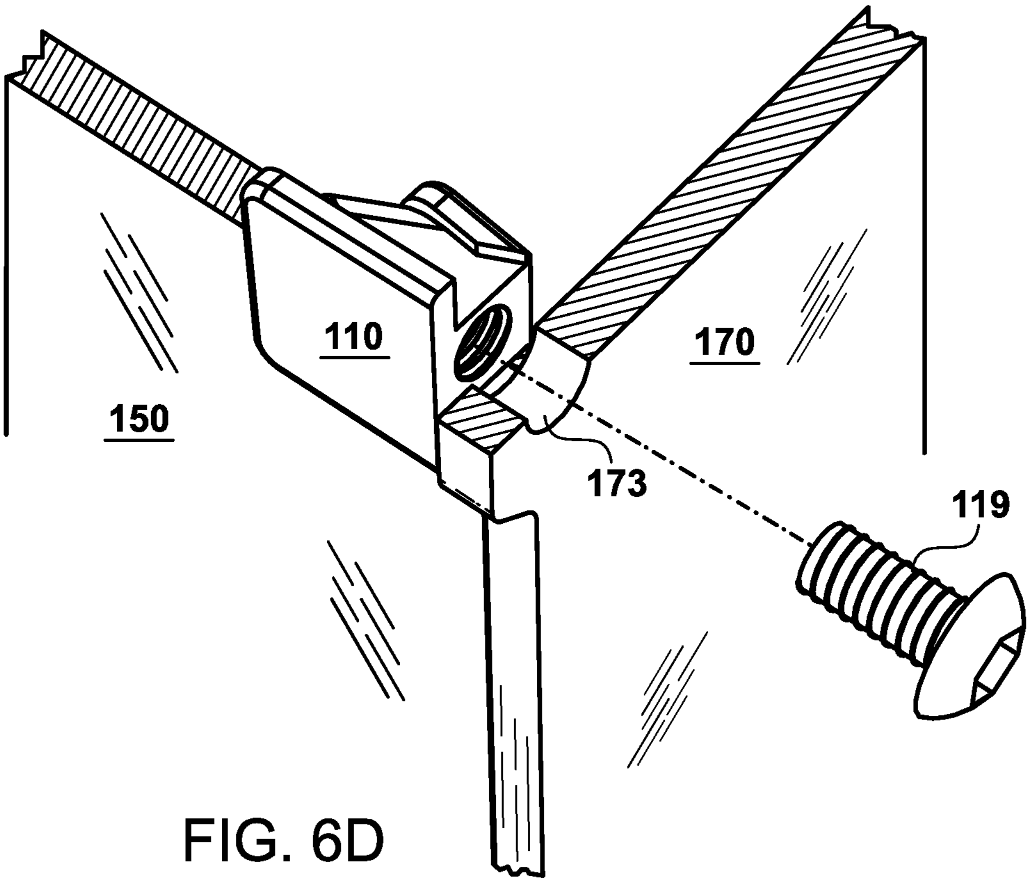
Figure 6E:
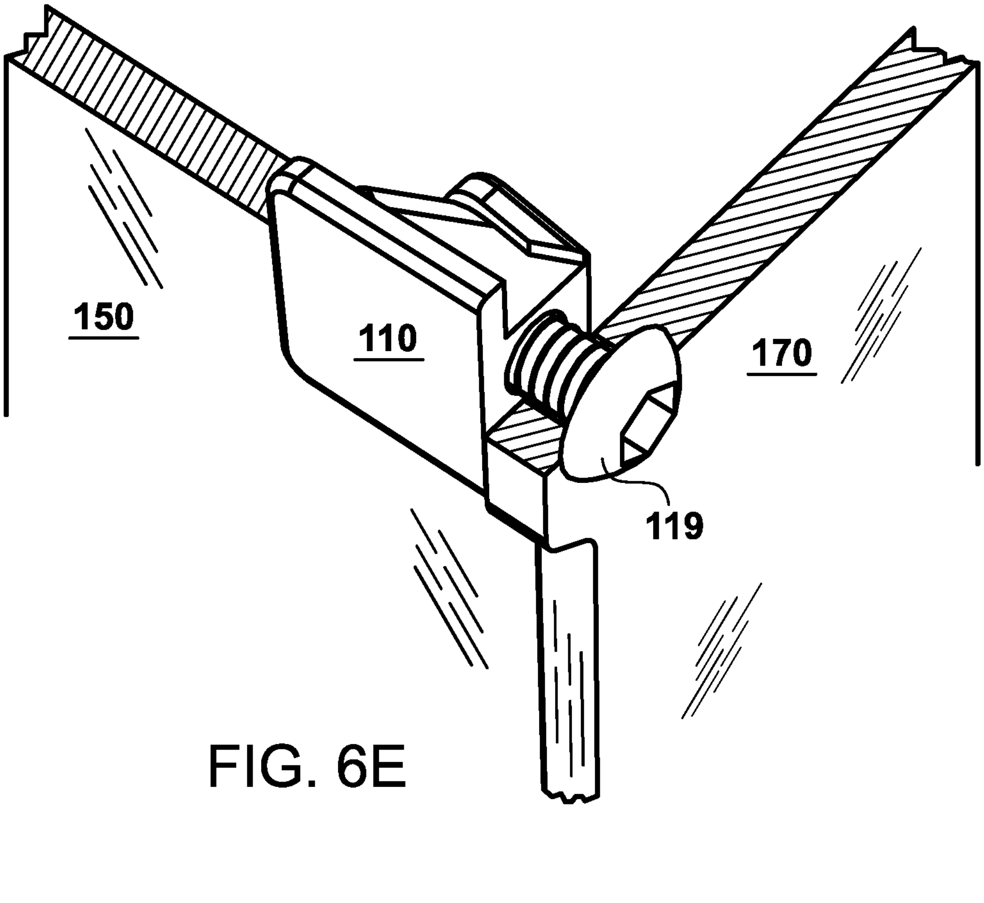

FIG. 6C illustrates, via arrow, the reason for the (informal terminology for visualization purposes) "wedge shaped fitting," as the fitting is moved into its panel groove/notch (the small part/small-front section of the fitting) going into its panel slot first, then sliding over its tapered middle section, then finally snapping into place (flush profile) as shown in FIGS. 6D & 6E).

FIGS. 6D and 6E are perspective views of the "completion and completed" panel fastening process, highlighting the fastener's/fitting's flush profile with its panel, and further showing the screw being screwed into its panel's screw hole into a perpendicular panel into its fitting, now snapped into place (as shown in FIG. 6E).

Figure 7A:
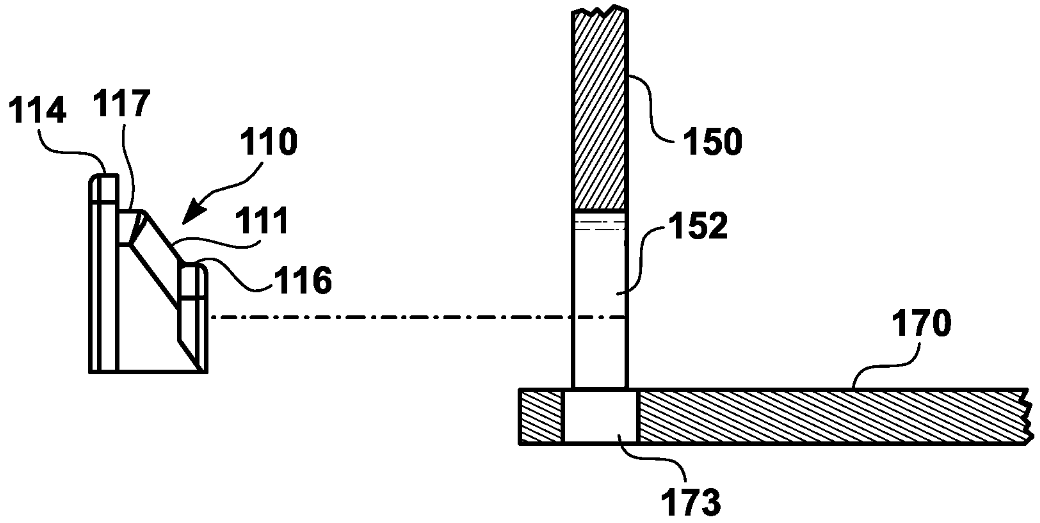

FIG. 7A is a top plan view of the fastener outside its panel's notch, illustrating the tapered middle section.

Figure 7B:
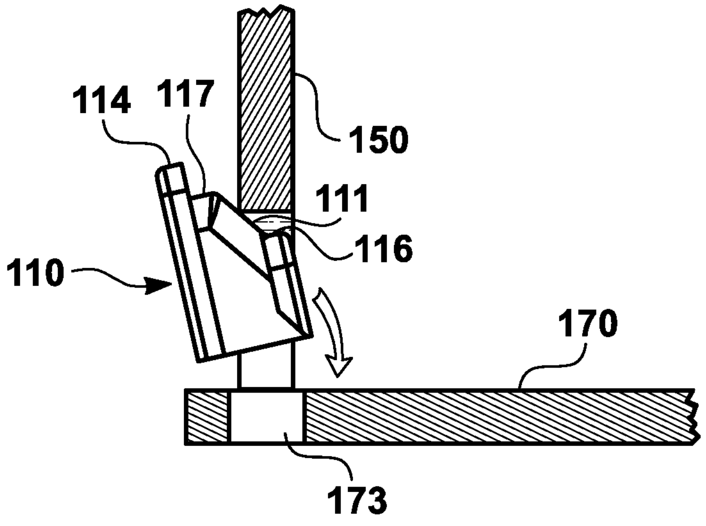

FIG. 7B is a top plan view of the fastener/fitting 110 being snapped into its panel's notch.

Figure 7C:
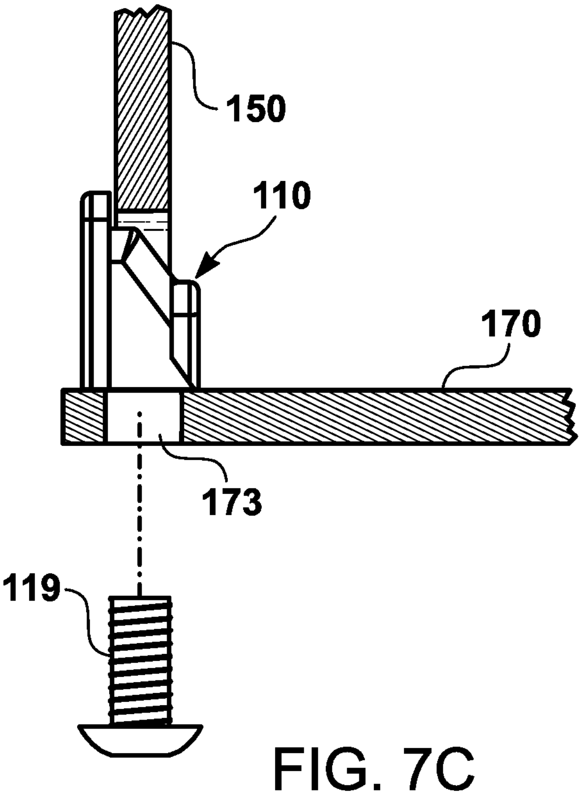

FIG. 7C is a top plan view of the now-adjoined perpendicular display case panels, with fitting already inserted-slid-snapped into place, illustrating where the screw will be positioned into its panel screw hole.

Figure 7D:
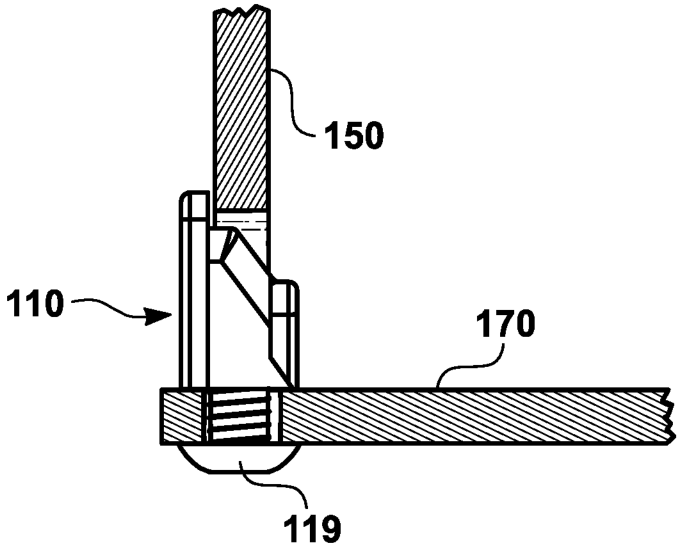

FIG. 7D is a top plan view of two display case panels now adjoined via fitting and screw, now assembled-fastened.

FIG. 8A features a perspective view of a single exemplary fitting.

FIG. 8B illustrates the multi-sectioned of a single exemplary fitting.

FIG. 8C shows the tapered angles comprised within the three sections of a fitting piece and the positioning of two of its key angles.

FIG. 8D illustrates a fitting piece viewed from four directions, here to illustrate the relative-dimensions and angles of the fitting's three sections. The top two drawings show the same fitting sitting up (upper left drawing) and laying down (upper right drawing). The bottom two drawings of FIG. 8D show the same fitting shown from the panel's inside (lower left drawing) and standing on its side (lower right drawing).

DETAILED DESCRIPTION OF ILLUSTRATIVE EMBODIMENTS

Figure 1:
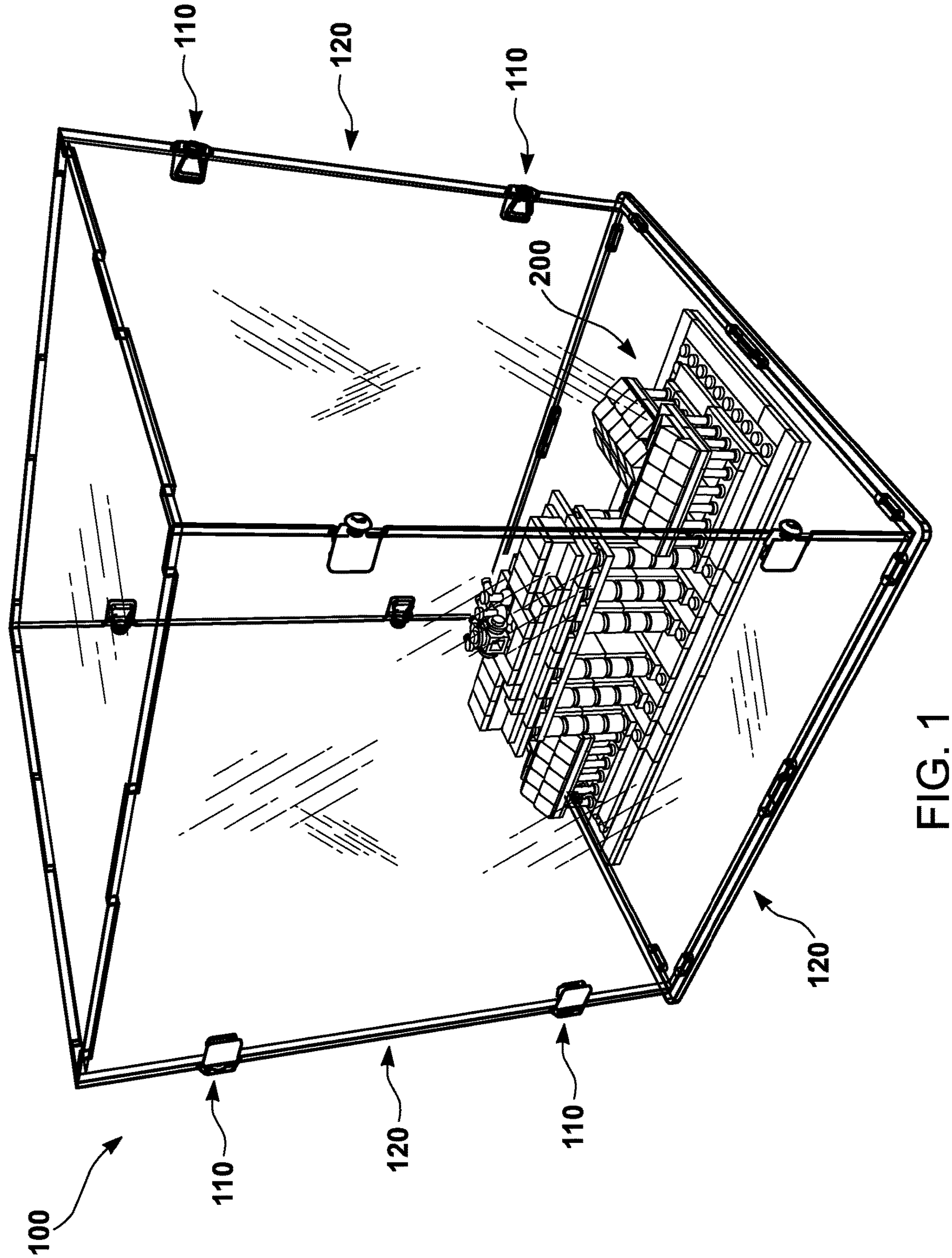
FIG. 1 is a perspective elevational view of the display case panel and fitting system (the LEGO™-style toy inside the display case is shown for perspective/context only and forms no part of the claimed design).

FIG. 1 is a perspective elevational view of the display case panel and fitting system (the LEGO™-style toy inside the display case is shown for perspective/context only and forms no part of the claimed design). The display case assembly 100 displays an aesthetic item 200 resting inside the case. The drawing shows multiple assembled Fittings 110 (connectors/fasteners) enclosed by Panels 120 (herein referring to any of the translucent panels).

Figure 2A:
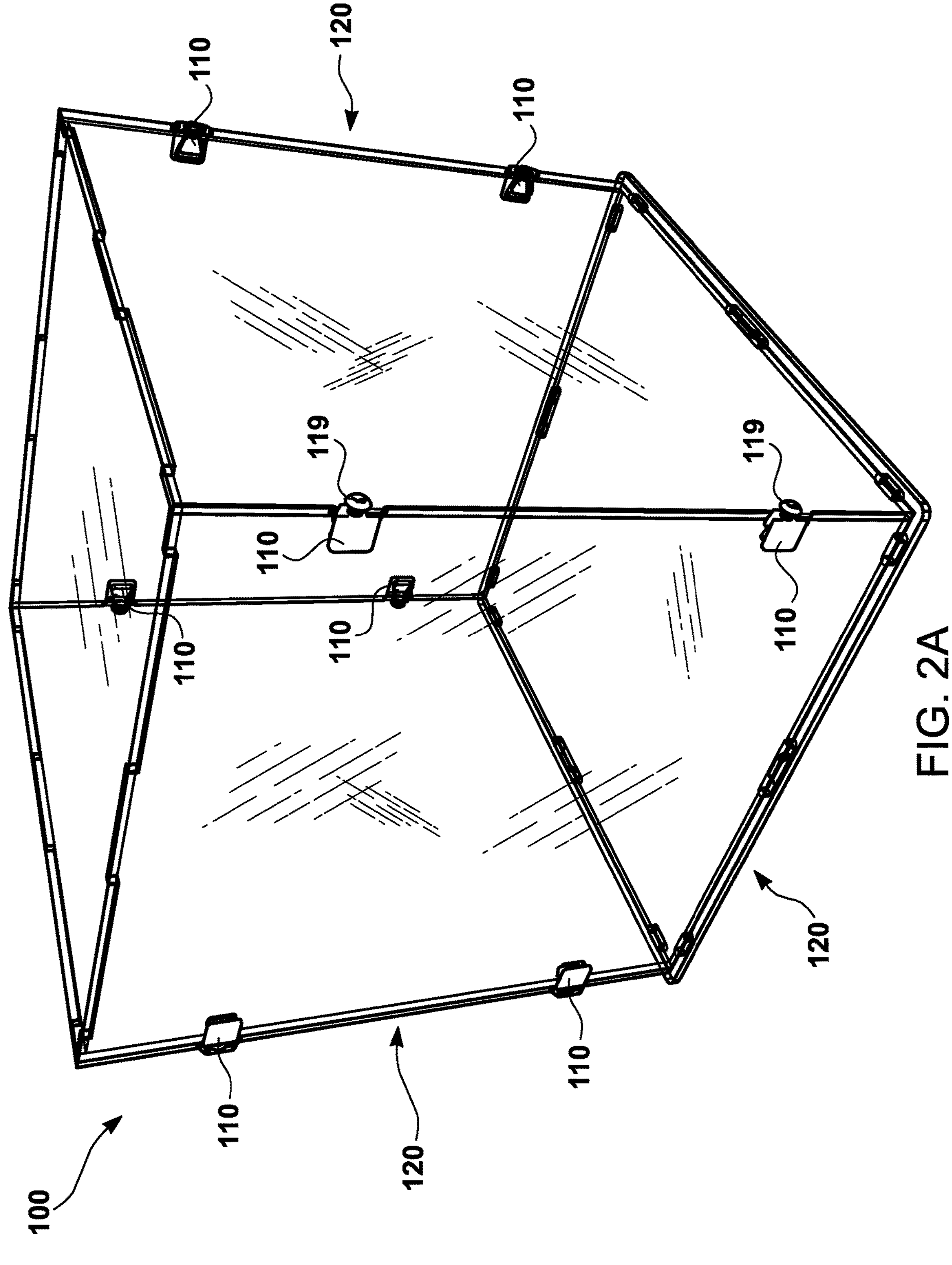
FIG. 2A depicts the perspective view of the invention without the inner-unclaimed-toy.

FIG. 2A shows the assembly 100 shown "as assembled" without a piece of art inside.

Figure 2B:
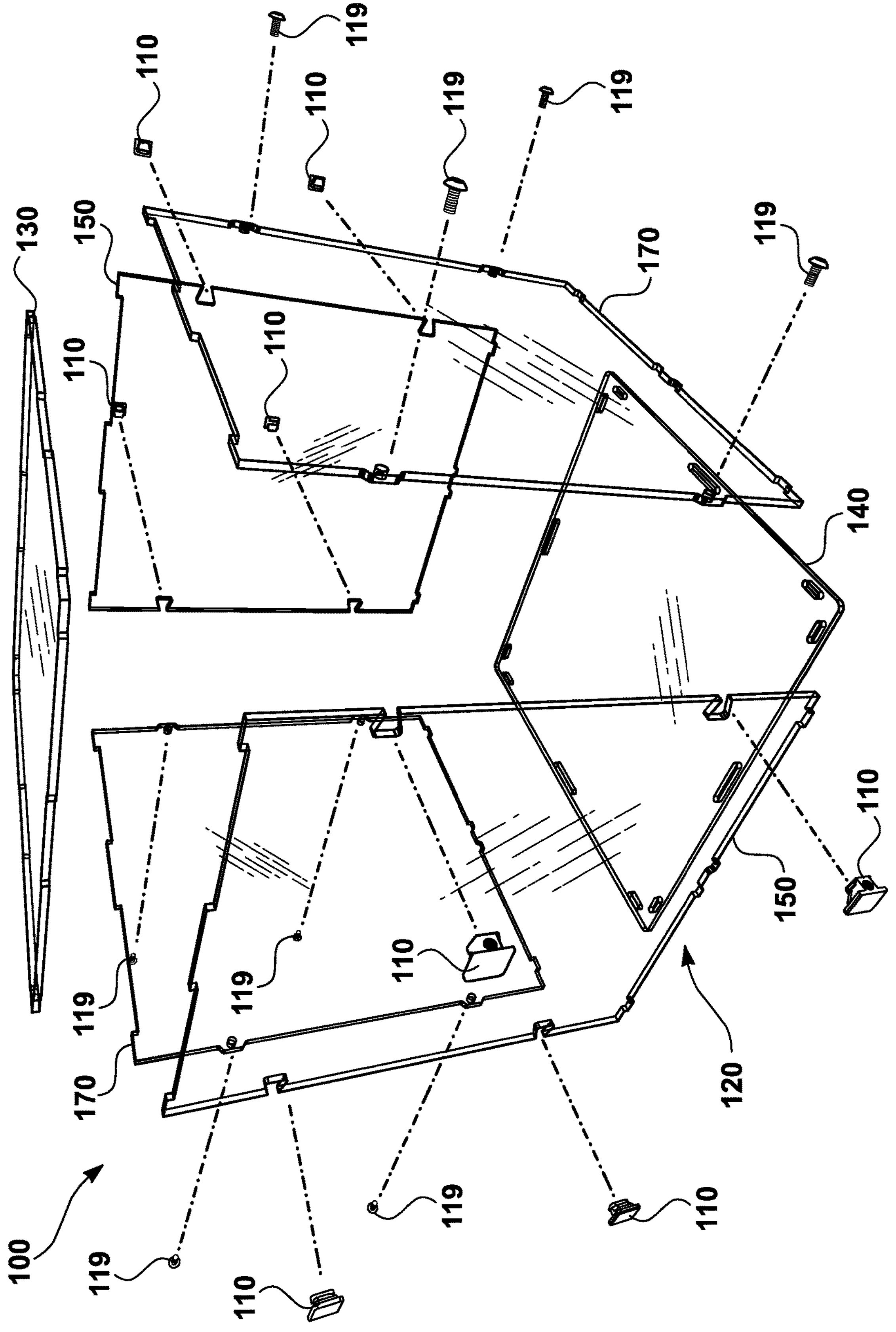
FIG. 2B is an exploded view of the invention's panels and other components.

FIG. 2B is an exploded view, showing the assembly's 100 Fittings (connectors/fasteners) 110, Screws 119, Panels 120 (herein referring to any of the translucent panels), Top Panel 130, Bottom Panel 140, Left/Right Panel 150, and Front/Back Panel 170.

Figure 3A:
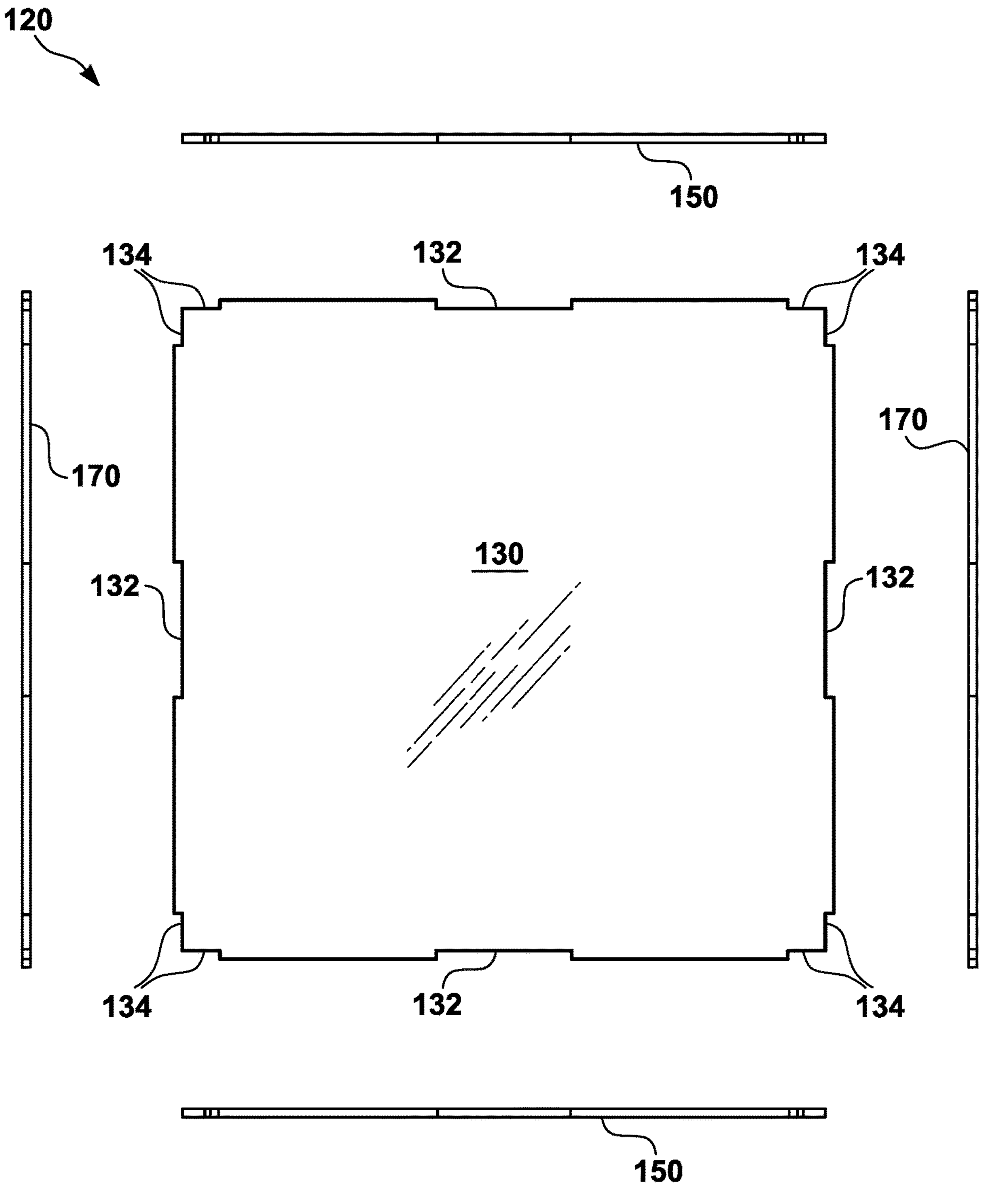
FIG. 3A is a top plan view of the invention's panels and their features.

FIG. 3A is an exploded view, showing the assembly's Left/Right Panel 150, and Front/Back Panel 170, Top panel 130, (optional) Indent 132 midway along edge of panel, and Corner Indent 134 on panels 120.

Figure 3B:
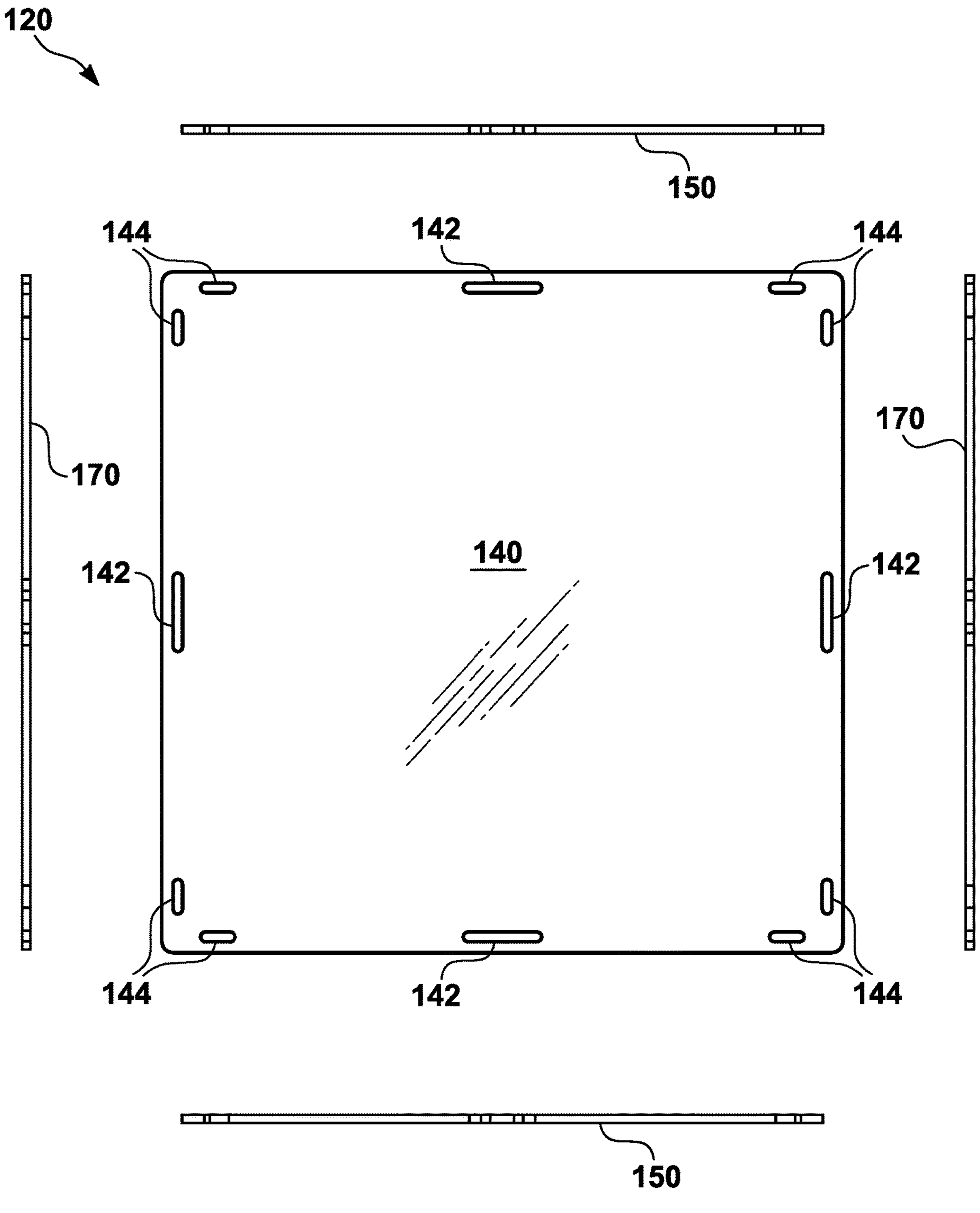
FIG. 3B is a bottom "worm's eye" view of the invention's panels and their features.

FIG. 3B is an exploded view, showing the assembly's Left/Right Panel 150, and Front/Back Panel 170, Bottom panel 140, (optional) midway notches 142, near-corner notches 144 along exemplary panels 120.

Figure 3C:
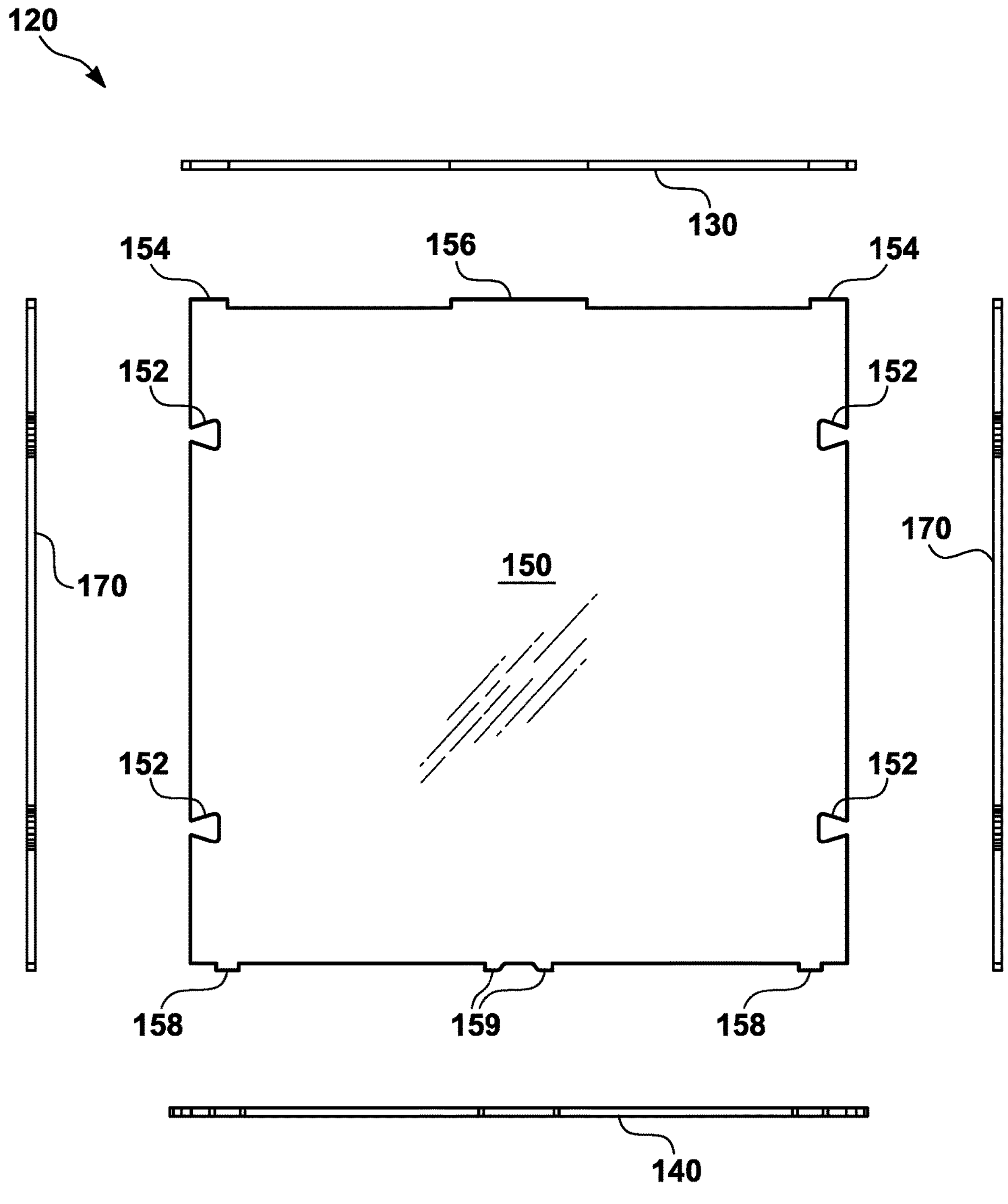
FIG. 3C is a side view of the invention's panels and their features.

FIG. 3C is an exploded view, showing Assembly's 120 Left/Right panel 150, Dovetail-shaped notch(es) 152, Corner tab(s) on upper edge 154, (optional) Midway tab(s) on upper edge 156, Tab(s) near corner on lower edge 158, (optional) Twin tabs midway on lower edge 159, front/back panels 170.

Figure 3D:
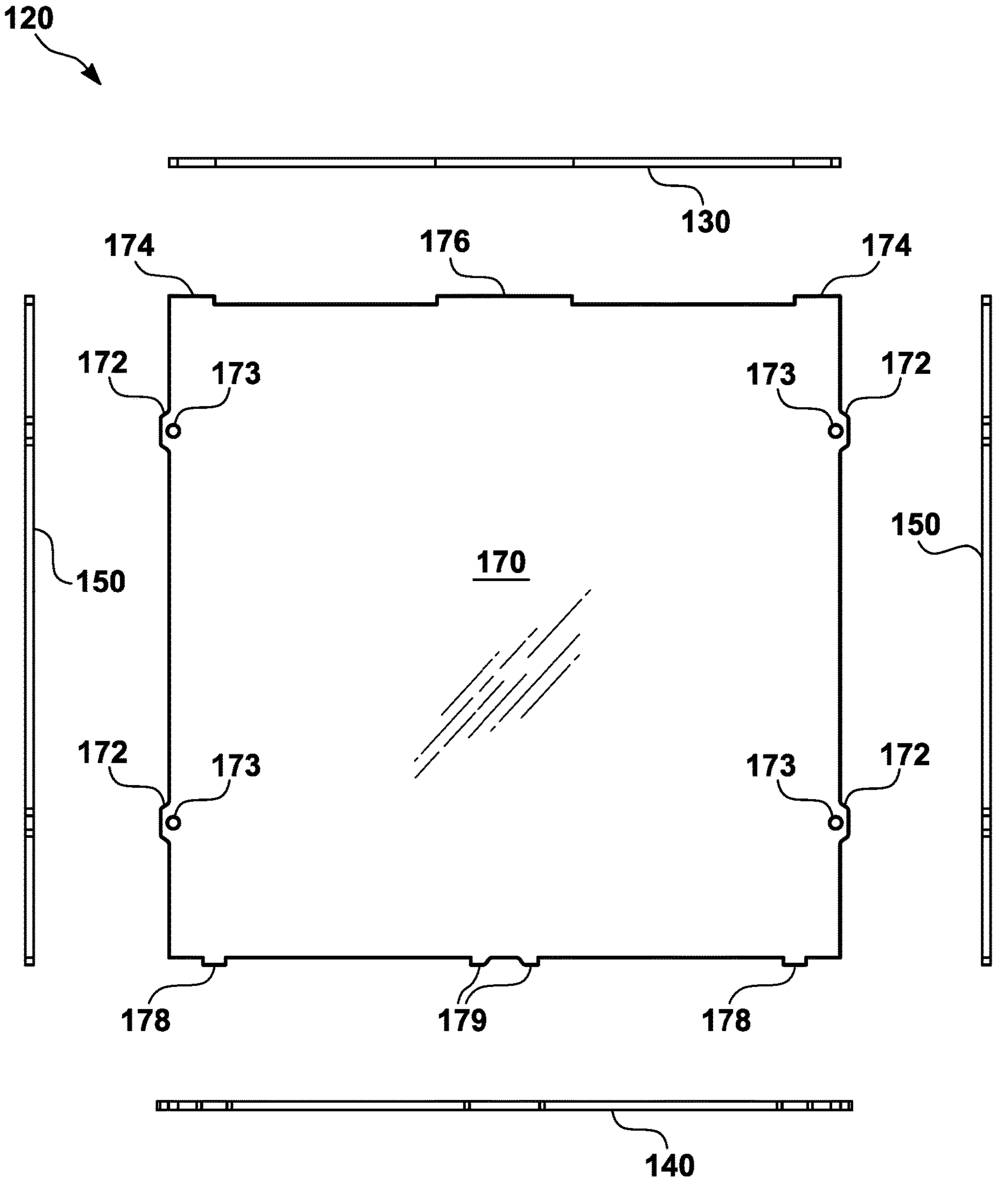
FIG. 3D is a front view of the invention's panels and their features.

FIG. 3D is an exploded view, showing Assembly's 120 Front/Back Panel 170, Side tab with screw hole 172, Screw hole 173, Corner tab on upper edge 174, (optional) Midway tab on upper edge 176, Tab near corner on lower edge 178, and (optional) Twin tabs midway on lower edge 179.

Figure 4A:
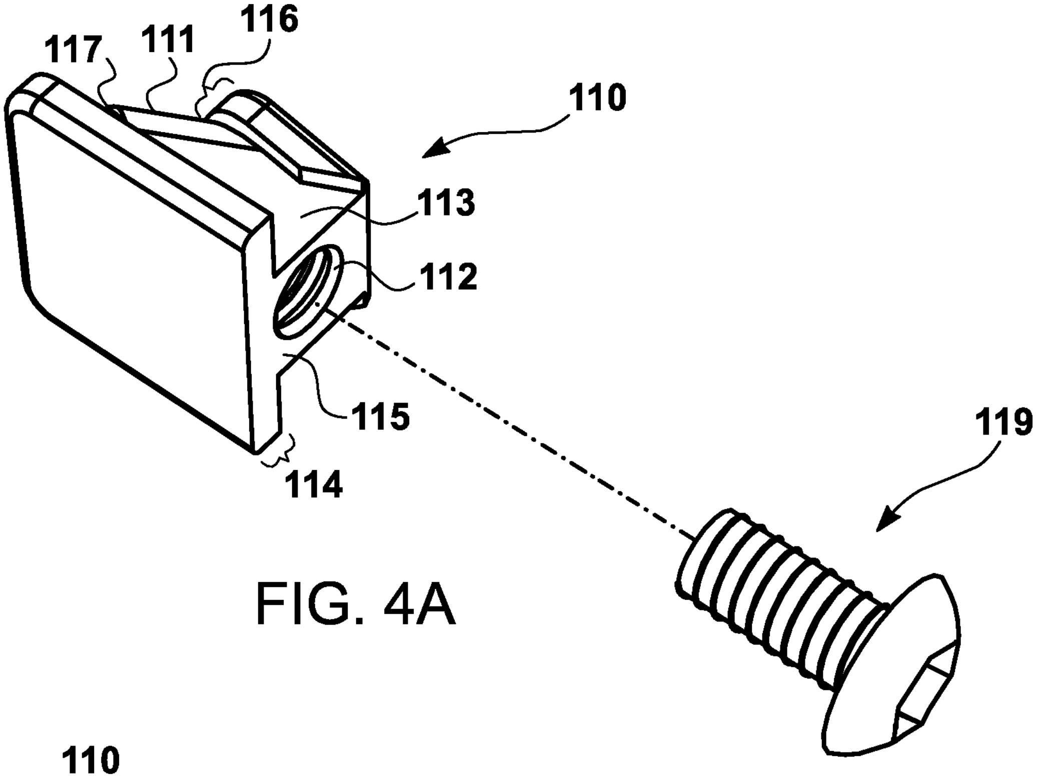
FIG. 4A is a perspective view of the invention's novel multi-section fitting. (This may be colloquially/informally described, for perspective-environment visualization purposes, as a multi-layered/multi-structured/multi-shelved type looking fitting-piece [informal terminology for visualization purposes only]).

FIG. 4A illustrates the invention's novel multi-sectioned fitting and an insertable screw 119. The fitting 110 comprises a relatively narrow inner section 116. This inner section 116 ultimately presses against the inside of a panel and has a surface area just slightly bigger than the surface area of its panel slot/notch, enabling the fitting 110 to act as a rim-lip to anchor the fitting 110 against its panel slot/notch (shown in FIG. 4B). (*Features 114, 116 and 111/113/117 each refer to a whole section, not just to a 2D (two-dimensional) surface).

When the fitting has been snapped into place, the rim section (peripheral-outer region) of the fitting's inner-section is slightly larger than the panel slot that the fitting is installed in. Initially, when inserting the fitting, the inner section is able to pass through the slot because it is at first positioned where the dovetail slot is wider, and set back from the front, where the dovetail slot narrows. Once the fitting is pressed into position, it automatically slides-&-snaps into the correct orientation, with the inner section forward against the sides of the narrower front of the dovetail slot.

The fitting 110 comprises a middle section 111/113/117 which allows for smooth "insert-slide-snap" positioning of the fitting 110 into its panel slot/notch.

Figure 4B:
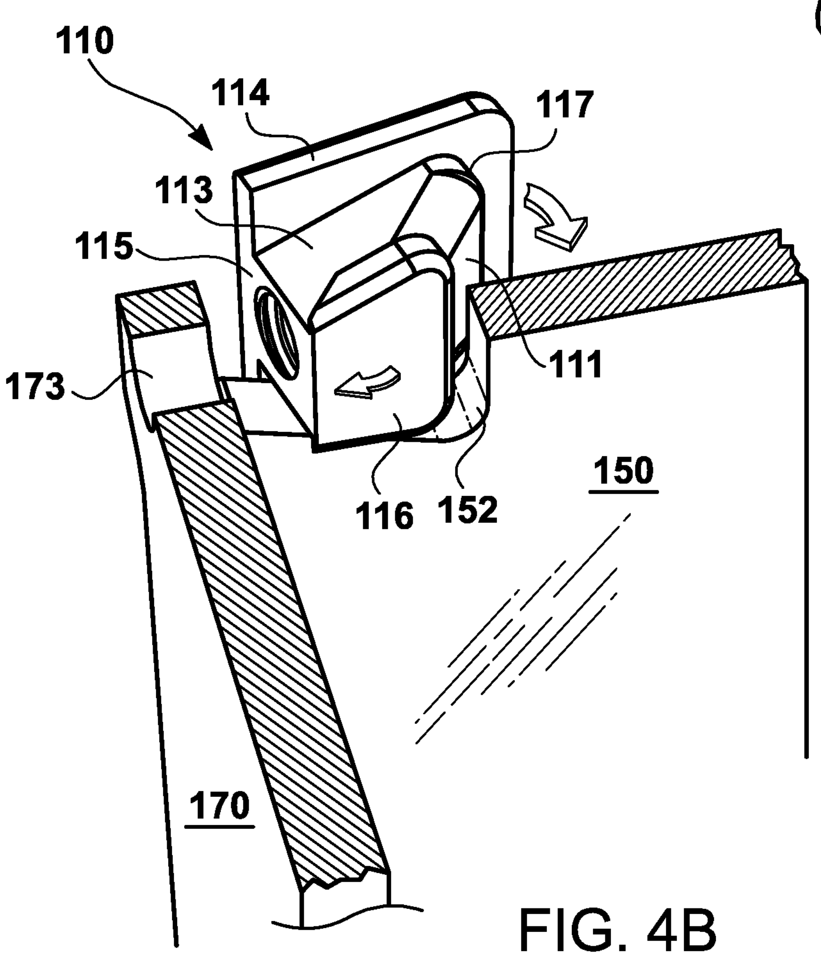
FIG. 4B is a perspective view of the invention's novel fitting being inserted-slid-then-snapped into its panel-notch.

The fitting's 110 relatively wide outer section 114 has a surface area substantially larger than the panel slot/notch (shown in FIG. 4B), this outer section 114 of the fitting 110 also acting as a lip-rim to further anchor the fitting 110 in its slot-notch (shown in FIG. 4B).

FIG. 4A also features the tilted-inward middle section 111 of the fitting 110. Also shown is its angled-side 113. The middle section 111 is shown. The fitting's central threaded screw hole/aperture 112 is shown. The angled side 113 is shown; this tapers inward going forward and tilts inward going up, as viewed in the top left drawing in FIG. 8D). The fitting's outer section 114 is shown. The vertical/planar fitting section 115 is shown. The inner section 116 is also shown. 116. The middle section 117 is positioned at the rear and doesn't extend all the way around, unlike the other two sections. Reference numbers 114, 116 and 117 each refer to a whole section, not just a 2D surface.

FIG. 4B shows how the fitting 110 inserts-slides-then-snaps into its panel notch 152 before a tightening screw further secures two perpendicular panels (150/170) together.

In FIG. 4B, the fitting 110 goes into its matching dovetail-shaped panel notch-slot 152 by first inserting the inner section 116 of the wedge-shaped fitting 110 into "smaller" part of the dovetail-shaped panel notch 152. As the fitting 110 is gradually inserted (slides across the edge of the notch 152), there is friction between the panel notch surface 152 and the fitting 110, which is eased into place (during the pushing process) by the tapered middle section 111/113/117 of the fitting 110. This friction eventually gives way to a "snap" fit when the middle section 111/113/117 is parallel/flush with the remainder of its notch 152, at which point the outer section 114 and the inner section 116 behave as lip-rim anchors to keep the fitting 110 in place (later further secured by a screw (not shown) which goes through panel hole 173 (here screw-hole) 173.

FIG. 5 is a perspective zoomed view of the invention, showing how the fitting (herein interchangeable with "fastener") snaps into a panel notch before a tightening screw further secures two perpendicular panels together.

FIG. 5 highlights the panel hole 173. FIG. 5 also highlights where the fitting 110 fits into its matching dovetail-shaped panel slot/notch 152. The screw 119 and perpendicular panels 150/170 are also shown.

FIG. 5 therefore depicts an assembled cabinet/display-case 100, with a magnified view of one of the fittings about to be inserted into a dovetail slot/notch 152 in its panel 150, and then fastened to a perpendicular panel 170 by means of screw 119.

This perspective zoomed view of the invention, shows where the fitting 110 inserts-slides-snaps into a dovetail-shaped panel notch 152 before a tightening screw 119 (through its panel screw hole 173) therein firmly securing two perpendicular panels 150/170 together.

FIG. 6A is a schematic view of a perpendicular panels' dovetail-shaped notch/slot and screw-hole, respectively, for perpendicular panels 150/170. Note that this fastening method applies to any to display case panels, whether ceiling or floor or side(s).

FIG. 6A illustrates how the two panels 150 and 170 are joined when viewed as cross-sectioned.

FIGS. 6B through 6E are perspective "before" and "during" and "after/as-assembled" views of the invention's assembly process (visa vis two perpendicular display case panels).

FIG. 6B highlights the panel's dovetail shaped notch-slot 152, and also shows the position of an exemplary panel's screw hole 173.

FIG. 6C illustrates, via arrow, the reason for the "wedge shaped fitting" 110, as the fitting 110 is moved into its panel groove/notch 152 (the small 116 part of the fitting 110 going in first, then sliding over its tapered middle section (111, as illustrated as 111 in FIG. 7A), then finally snapping into place (flush profile) as shown in FIGS. 6D & 6E).

FIGS. 6D and 6E are perspective views of the "completion and completed" panel fastening process and result, highlighting the fastener's/fitting's 110 flush profile with its panel 150 inside its notch panel 152, and further showing the screw 119 being screwed into its panel's 170 screw hole 173 into the perpendicular panel 150 into its fitting 110, now snapped into place (as shown "assembled" in FIG. 6E).

FIG. 7A is a top plan view of the fastener 110 outside its panel's notch, illustrating the tapered middle section. Feature 111 is the tilted and inward tapering middle section. Feature 114 is the outer 114 section. Feature 116 is the inner-section 116. Feature 117 is the mid-section (117 herein shown at the rear, showing its taper does not extend all the way around like the other two fitting 110 sections.

Feature 152 is the dovetail-shaped panel notch 152 promoting easy "one way in" insertion. Feature 173 is the panel hole 173 (here the panel's screw-hole 173). Perpendicular panels 150/170 are shown.

FIG. 7B is a top plan view of the fastener/fitting 110 being snapped into its panel's notch 173.

FIG. 7B shows the fastener/fitting 110 ultimately being "snapped" into its panel's notch 173. The fastener/fitting 110 is inserted-then-slid-then-push-snapped into its panel's notch 173. Feature 114 is the fitting's 110 outer section 114. Feature 117 is the fitting's 110 mid-section 117. Feature 111 is the tilted and inward-tapering rear surface (region facing the panel) of the fitting's middle section 111. Feature 117 is the middle-region 117 of the fitting's middle-section 111. Feature 116 is the fitting's 110 inner 116 section. Together, as shown, these fitting 110 sections allow the smooth insert-slide-snap joinder-method.

FIG. 7C shows the fitting 110 inserted/flush with its panel 150. The screw 119 will, when assembled, fit into its hole 173. FIG. 7C shows the now-adjoined perpendicular display case panels (150/170), with fitting 110 now inserted-slid-snapped into place, illustrating where the screw 119 will go into its panel screw hole 173.

FIG. 7D illustrates two panels 150/170, with screw 119 in its fitting 110. This top plan view of two display case panels (150/170) shows the panels now adjoined via fitting 110 and screw 119, now assembled-fastened.

FIGS. 8A-C depict various viewpoints of the fitting 110, and FIG. 8D depict each of the orthographic views of the fitting 110. These figures are provided so that the geometry, and angled surfaces of the fitting 110 can be more clearly observed and understood. As can be seen in the drawings, the fitting 110 is illustrated in symmetrical fashion along one axis.

FIG. 8A features the tapered angles of the fitting's 110's sections. Feature 111 comprises a tilted and inward-tapering rear surface of the middle section 111. Feature 112 is the fitting's 110 screw hole 112. Feature 113 is the angled side 113 (this region tapers inward, going forward and tilting inward while going up (as shown from different angle in the top-left drawing of FIG. 8D)). Feature 116 is the fitting's inner section 116. Feature 114 is the fitting's outer section 114. Feature 115 points to the fitting's 110 outer section, featuring the outer section's 110 outermost-facing-region 114.

FIG. 8B is a figure showing the tapered angles of the fitting piece. FIG. 8B illustrates the tapered angles of the fitting piece 110. Feature 111 is the tilted and inward tapering middle section 111 of the fitting 110. Feature 114 is the fitting's 110 outer section 114. Feature 116 is the inner section 116. Feature 117 is the outermost region 117 of the fitting's middle section.

FIG. 8C shows the tapered angles of the fitting piece 110 and the positioning of its 110 key angles.

Feature 111 is the tilted and inward tapering middle section 111. Feature 113 is the side portion of the middle section 111, which is an angled side 113 (this region tapers inward going forward and tilts inward going up, as viewed in the top left drawing in FIG. 8D)). Feature 114 the fitting's 110 outer section 114. Feature 116 is the inner 116 section of the fitting. Feature 117 is the non-angled portion of the fitting's middle section 111.

Feature 180 represents the middle region of the fitting's middle section 111 (Angle herein numbered 180 represents the angle between the surface and the horizontal plane). Feature 182 represents one of the Dovetail middle-section 111 taper angles between outer section 114 and the inner section 116.

Angle 182 illustrates how the middle section's 111 angles taper inward toward the inner section 116 to match the dovetail socket.

FIG. 8D illustrates, in measured schematic fashion, the fitting piece seen from four directions, here to illustrate the relative-dimensions and angles of the fitting's sections. The top two drawings show the same fitting 110 sitting up (upper left drawing) and laying down (upper right drawing). The key relative dimensions here are the difference between the relative lengths of distance 168 and distance 169. The additional length of 168 on each side is what ultimately functions as a rim-lip on the inside of the display case panel, securing the inside of the fitting 110 to the inside of its panel 150/170 (as seen in 4B, 6C, 6D, 6E, 7B, and 7C).

The bottom two drawings of FIG. 8D show the same fitting 110 shown from the panel's inside (lower left drawing) and standing on its side (lower right drawing).

FIG. 8D shows the tapered angles of the fitting piece relative to the relative-dimensions of the fitting's sections. The fitting piece 110 is seen from four directions, here to illustrate the relative-dimensions and angles of the fitting's three main sections.

The key relative dimensions here (upper right drawing) are the difference between the relative lengths of distance 160 and distance 168. The additional length of 160 (greater on each side than distance 168) is what ultimately functions as a fitting-securing rim-lip on the outside of the display case panel 150/170, securing the outside of the fitting 110 to the outside of its panel 150/170 (as seen in FIGS. 4B, 6C, 6D, 6E, 7B, and 7C).

Focusing on the lower-right drawing of FIG. 8D, the relative widths (the relative dimensions of width 162 compared with width 167), illustrate what ultimately secures the outer section of the fitting 110 to the outside of the panel 150/170.

In this fashion, if viewed from the outside of the panel 150/170 as seen in FIGS. 4B, 6C, 6D, 6E, 7B, and 7C, we see that the fitting's outer section 162 has a larger surface area than the inner section's inner section 167, shown by the greater length of delineated length 162 than delineated length 167, therein forming a securing "rim-lip" on the outside of the panel 150/170, which helps to keep the fitting securely in place (as seen in FIGS. 4B, 6C, 6D, 6E, 7B, and 7C).

Various (and Alternate) Embodiments

In its "best mode" embodiment, the panels are between about 3 mm and about 3.5 mm Acrylic, each fitting has an overall length of about 12 mm x height of about 11 mm and an overall width of about 6.5 mm, and the fitting 110 is comprised of a thermoplastic polymer with a softer durometer than the Acrylic. An exemplary "middle section" 111/113/117 have an overall combined width of 3.5 mm. The instant fitting 110 is scalable to Acrylic that is 1-12 mm thick. (The fitting proportions would also proportionally change).

An exemplary panel may have an overall width of about 3.5 mm, but display case panels are often found with widths of approximately 6 mm (therein utilizing the herein-disclosed fitting 110 with the same ratios but proportionally larger sizes). Note that the herein-disclosed method and apparatus-devices work for virtually any display case sizes, and for numerous panel composites/composition materials.

In alternate embodiments, the display case panels comprise different arrays of tabs and notches for joining, and the herein-disclosed method works for different applications (e.g. cabinets, boxes, shelves, or any items wherein walls/panels require elegant "virtually invisible" joining method(s)).

Alternate fitting and panel embodiments further comprise fitting-holes and panel-notches angled for "angled display cases" wherein the resulting "box" is artfully tilted rather than straight/perpendicular. In alternate aspects/embodiments, the herein-disclosed methodology and apparatus-devices would remain materially identical.

Results

While the fitting comprises three main sections, it may be colloquially referred to as a "wedge-shaped fitting" which allows snap-in-place assembly, allowing snug fit in what's colloquially referred-to as a panel 110 notch/socket/groove, increasing stability, providing sleek flush profile, and substantially preventing dust and moisture.

'Wedge and screw' system provides stability and easy assembly for all panel sizes.

Easy to assemble, as fittings are instantly pre-aligned with screw holes in proper direction.

Tailored panel notches and tabs allow for multiple modular display case sizes, and optional tabs/notches/fittings/screws allow for larger display cases.

Novel fitting 'colloquially viewed as tapered wedge shape' fitting engineering, each fitting comprising indentations and tapering such that the fitting's inner section fits snugly in the panel groove, while the fitting's outer section provides stability such that panels hold together without the fitting falling into or out-of the display case, while the fitting's middle section is tapered for easy 'slide in/snap-in' assembly.

Fitting requires no swiveling or fumbling or 'holding in place while being screwed in.'

Small in size, as low as [or lower than] about 12 mm length fitting piece, allowing for attractive flush profile look. Smaller (and larger) fittings and panels are eligible as well.

System is modular and adjustable for any variety of display case panel shapes and sizes, from (e.g.) 24,336 $cm^3$ to 278,512 $cm^3$ and beyond (not limiting).

Wedge & screw is 'self-guiding' and 'one way' to prevent mistakes; others use insert/rotate/screw. Others' require fittings to rotate to become perpendicular (accessible) and the others do not snap-in.

The middle section may have at least one tapered angle-slope between the inner section and the outer section, the tapered slope comprising at least one angle between about 15° and about 85°

The fitting may have a maximum length of between about 3 mm and about 96 mm, and the (functionally) anchoring "rim-lip" of the inner fitting section may be between about 1.0 mm and about 12 mm.

The fitting may have a maximum length of between about 6 mm and about 96 mm.

The fitting's inner section's "anchoring rim" may be between about 1 mm and about 8 mm.

The panels may have a thickness of between about 1 mm and about 12 mm.

The middle section of the fitting may have least one tapered angle-slope between the inner wedge face region of the inner section (the inner-most portion of the inner section)

and the outer face section (the portion of the middle section closest to the panel), the tapered slope comprising at least one angle between about 15° and about 85°.

The fitting may have a maximum length of between about 9 mm and about 15 mm, and the anchoring rim-lip of the inner fitting section is between about 1.0 mm and about 2 mm.

The fitting's inner anchoring rim may be 1.5 mm. The panels may have a thickness of between about 1 mm and about 12 mm.

Specifications Generally

In the Summary above and in this Detailed Description, and the Claims below, and in the accompanying drawings, reference is made to particular features of various embodiments of the invention. It is to be understood that the disclosure of embodiments of the invention in this specification includes all possible combinations of such particular features. For example, where a particular feature is disclosed in the context of a particular aspect or embodiment of the invention, or a particular claim, that feature can also be used to the extent possible-in combination with and/or in the context of other particular aspects and embodiments of the invention, and in the invention generally.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

In the present disclosure, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

In various embodiments, elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of embodiments of the invention, even those disclosed solely in combination with other features of embodiments of the invention, may be combined in any configuration excepting those readily apparent to the person skilled in the art as nonsensical. Likewise, use of the singular and plural is solely for the sake of illustration and is not to be interpreted as limiting.

In the present disclosure, all embodiments where "comprising" is used may have as alternatives "consisting essentially of," or "consisting of." In the present disclosure, any method or apparatus embodiment may be devoid of one or more process steps or components. In the present disclosure, embodiments employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an embodiment "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Many suitable methods and corresponding materials to make each of the individual parts of embodiment apparatus are known in the art. According to an embodiment of the present invention, one or more of the parts may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described herein-above may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f). Elements recited in means-plus-function format are intended to be construed in accordance with 35 U.S.C. § 112 (f).

Recitation in a claim of the term "first" with respect to a feature or element does not necessarily imply the existence of a second or additional such feature or element.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components.

The invention claimed is:

1. A method for constructing a display case wherein at least two perpendicular panels are screw-clamped together, each panel with an inside surface and an outside surface and at least one edge, are joined such that a first panel comprises at least one tab comprising at least one screw hole, and a second, perpendicular panel comprises at least one substantially dovetail-shaped groove with at least one outer-facing edge, and wherein the second panel's dovetail groove houses a substantially wedge-shaped tapered fitting with at least one outer-facing edge, the fitting comprising a central threaded screw hole whose aperture is positioned at the fitting's outer-facing edge, wherein the fitting is first inserted, or angled, into its matching dovetail shaped panel-groove, then pushed forward toward the edge of the panel until the fitting fully snap-locks into its groove, the fitting thus laying flush with its panel, said fitting, though molded as one piece, comprises three operative sections to facilitate this positioning:

an outer-face section which ultimately rests flush-flat with the outside surface of its panel groove, anchoring the fitting to the outside surface of the panel, an innermost face section with a rim which ultimately anchors the fitting to the inside of the panel, and a tapered middle section which ultimately rests against the edge of the dovetail panel groove, wherein the tapered middle section comprises at least one tapered angle-slope extending from the outer-face section to the innermost face section, the tapered angle-slope comprising at least one angle between about 15° and about 85°.

2. The invention of claim 1 wherein the fitting's inner and outer face sections both have a surface area slightly larger than the surface area of the panel dovetail groove such that, when inserted, the additional surface areas further anchor the fitting inside its panel groove, wherein the anchoring is fundamentally made possible due to the fitting's tapered middle section comprising an angle between about 15° and about 85°.

3. A display case comprising at least two perpendicular panels, each panel with an inside surface and an outside surface and at least one edge, wherein the first panel comprises at least one tab comprising at least one screw hole, and wherein the second, perpendicular panel comprises at least one substantially dovetail-shaped groove with at least one edge, and wherein the second panel's dovetail groove houses a substantially wedge-shaped tapered fitting, the fitting comprising a central threaded screw hole whose aperture is positioned at the fitting's outer-facing edge, wherein the fitting is positioned inside its matching dovetail shaped panel-groove, and wherein the fitting lays flush with its panel and ultimately comprises a screw that fully clamps the two perpendicular panels together, and wherein the fitting, though molded as one piece, comprises three operative sections:

an outer-face section which ultimately rests flat with the outside surface of its panel groove, anchoring the fitting to the outside surface of the panel, an innermost face section which ultimately anchors the fitting to the inside of the panel, and a tapered middle section which ultimately rests against the edge of the dovetail panel groove, wherein the tapered middle section comprises at least one tapered angle-slope extending from the outer-face section to the innermost face section, the tapered angle-slope comprising at least one angle between about 15° and about 85°.

* * * * *